April 11, 1961 P. E. BESSIERE 2,978,987
FUEL INJECTION PUMPS
Filed May 20, 1957 2 Sheets-Sheet 1

INVENTOR
Pierre Etienne Bessiere
BY
Bailey, Stephens & Huettig
ATTORNEYS

April 11, 1961

P. E. BESSIERE 2,978,987

FUEL INJECTION PUMPS

Filed May 20, 1957

INVENTOR
Pierre Etienne Bessiere
BY
Bailey Stephens & Huettig
ATTORNEYS

United States Patent Office 2,978,987
Patented Apr. 11, 1961

2,978,987

FUEL INJECTION PUMPS

Pierre Etienne Bessiere, 55 Blvd. Charcot,
Neuilly-sur-Seine, France

Filed May 20, 1957, Ser. No. 660,362

Claims priority, application France May 24, 1956

6 Claims. (Cl. 103—41)

The present invention relates to fuel injection devices including an injection pump of the piston type and at least one injector which is opened by the action of the pressure of the fuel delivered by said pump as soon as this pressure reaches a predetermined value.

It has already been proposed to reduce the rate of increase of the pressure of the fuel subjected to the action of the pump by providing means for allowing fuel to leak out from the pump cylinder, in order to adjust the injection advance in accordance with variations of the speed of the engine on which the injection device is fitted.

The object of my invention is to provide an improved pump for use in such a fuel injection device.

The pump according to my invention is characterized in that it comprises means for preventing the fuel from leaking out from the pump cylinder, said last mentioned means being controlled in such manner as to operate when the pressure of the fuel, which is being increased by the displacement of the piston pump, reaches a predetermined value lower than the pressure which produces injection, the means which serve to drive the pump piston being arranged in such manner as to give it an increasing speed at least during its fuel compression and delivery stroke.

Preferred embodiments of the present invention will be hereinafter described with reference to the accompanying drawings, given merely by way of example and in which.

The pump according to my invention is intended to be used in cooperation with at least one injector, not shown on the drawings, mounted on one of the cylinders of the engine (explosion engine or gradual combustion engine) to be fed with fuel. This injector opens under the action of the pressure of the fuel delivered by the pump and thus achieves the injection of fuel into the engine cylinder as soon as the pressure of the fuel acting upon said injector reaches or exceeds a predetermined value. Injectors of this kind are well known in the art and need not be described in detail.

Figure 1:
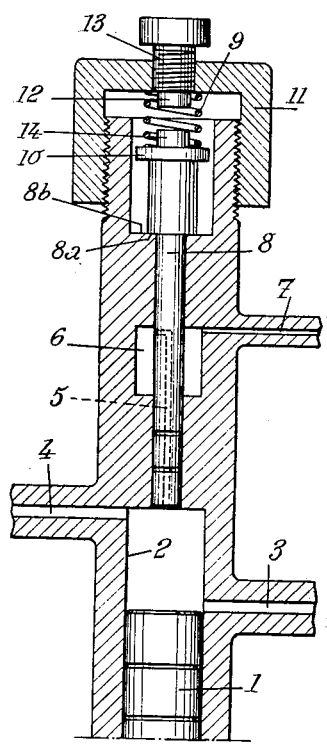
Figs. 1 to 4 show, in part axial section, four different embodiments of an injection pump belonging to a fuel injection device according to the invention, such a pump being itself made according to the invention.

On Fig. 1, which shows a first embodiment of an injection pump made according to my invention, reference numeral 1 designates the pump piston, which reciprocates in cylinder 2 and is driven for instance by a cam C, in such manner that its upward movement (compression and delivery stroke) takes place at an increasing speed.

Figure 1A:
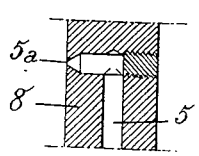
Fig. 1a shows, on an enlarged scale, a detail of the structure of Fig. 1.

An inlet conduit 3 opens into cylinder 2. This conduit 3 is connected in the usual fashion with a transfer pump which fills up cylinder 2 with fuel when piston 1 is in the position illustrated by Fig. 1. The top end of cylinder 2 is connected through a delivery conduit 4 with the injector above referred to, this conduit 4 including in the usual fashion a check valve (not shown). In order to reduce the rate of increase of the pressure of the fuel during the upward stroke of the piston, I provide a fuel leak passage 5 one of the ends of which opens into the upper end of cylinder 2, whereas the other end of said leak passage forms a small calibrated opening 5a (see Fig. 1a) opening into a discharge chamber 6 provided in the pump body and connected, through a conduit 7, with the fuel tank or another space where the pressure is low.

Passage 5 is provided in a movable part having for instance the form of a rod 8 the lower end of which is adjacent to the upper end of cylinder 2 and which is slidable in the pump body. Passage 5 extends axially in said rod 8 from the lower end thereof to a level which is slightly (for instance some tenths of a millimeter) below the top wall of chamber 6, whereby the calibrated opening 5a is closed as soon as rod 8 has been slightly moved upwardly. Thus rod 8, with its passage 5—5a constituted as a kind of slide valve.

Rod 8 is kept in its lower position, determined by the contact of a shoulder 8a of rod 8 with a bearing surface 8b provided in the pump body, by a return spring 9. One of the ends of this spring is bearing against an annular projection 10 of rod 8 and the other end against a cap 11 which is screwed on the pump body so that the tension of spring 9 is adjustable. This cap is provided with an abutment 12, preferably adjustable in position with respect to said cap, by means of screw-threads 13 so that the end 14 of rod 8 can bear against said abutment 12.

The operation of the device shown by Fig. 1 is as follows:

When piston 1 starts moving upwardly, it first closes the outlet of inlet conduit 3. Once this outlet is closed, the pressure rises in cylinder 2 and in delivery conduit 4. However, due to the presence of leak passage 5, the rate of increase of the pressure is reduced.

It will be supposed that the pressure necessary in order to overcome the resistance of return spring 9 and to move rod 8 upwardly is equal to 50 atmospheres, and that the fuel pressure necessary to cause the injector to open is equal to 90 atmospheres. During the first part of the upward movement of piston 1, there is produced a relatively slow rise of the pressure in cylinder 2, until the pressure of 50 atmospheres is reached. Rod 8 is then moved upwardly and closes the outlet of the leak passage 5, this upward movement of rod 8 being limited by the fact that its end 14 comes into contact with abutment 13. Then the pressure rises practically instantaneously up to 90 atmospheres so that injection is started.

The pressure of 50 atmospheres which causes the leak passage to be closed is the more quickly reached as the speed of the engine which drives piston 1 is higher.

Figure 5:
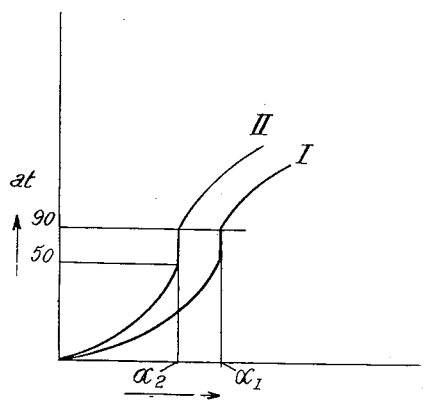
Fig. 5 shows curves illustrating the operation of my device.

Fig. 5 illustrates the action of the leak passage on the fuel injection advance.

On this figure, the abscissas correspond to the positions of piston 1 in its cylinder during the upward stroke of the piston, from the time it closes inlet conduit 3, whereas the ordinates correspond to the pressures in cylinder 2.

Fig. 5 shows two curves designated by I and II.

Curve I corresponds to the variation of pressure for a speed of piston 1 corresponding to a relatively low number of revolutions per minute of the engine (for instance 1800 revolutions per minute), whereas curve II corresponds to a higher speed of the engine, for instance 2000 revolutions per minute.

In the first case, the pressure of 50 atmospheres in cylinder 2 is reached for the position $\alpha_1$ of the piston in its cylinder ($\alpha$ being the angle of advance of injection). For this position there is produced a sudden rise of the pressure from 50 to 90 atmospheres, so that position $\alpha_1$ corresponds to the beginning of injection for said speed of 1800 revolutions per minute of the engine. If, on the contrary, the engine is running at 2000 revolutions per minute, the rise of pressures in cylinder 2 is quicker with respect to the various positions occupied successively by piston 1 in its cylinder 2. The pressure of 50 atmospheres is already reached for the position $\alpha_2$ of piston 1 in its cylinder whereby, for this speed of the engine, the injection advance corresponds to $\alpha_2$. It is greater than for the speed of 1800 revolutions per minute.

Thus I obtain, by means of the device according to my invention, an automatic variation of the advance of injection in accordance with the speed of the engine. The pressure for which the leak passage is closed can be modified by adjusting spring 9 or to any other adjustment means, not shown, capable of acting upon the section of the leak.

From what precedes, it results that the injection pump must start its compression stroke earlier than in the usual pumps. In other words, the pump according to my invention must have an excess of advance. This excess is corrected by the lag produced by the presence of the leak passage during the rise of pressure of the fuel subjected to the action of the pump piston inside the pump cylinder. This lag is reduced when the speed of the engine increases, which causes an increase of the injection advance, and it is increased when the speed of the engine decreases, which corresponds to a reduction of the injection advance. For instance, I may obtain that the lag which serves to correct the advance varies in inverse ratio to the square of the number of revolutions per minute of the engine.

Figure 2:
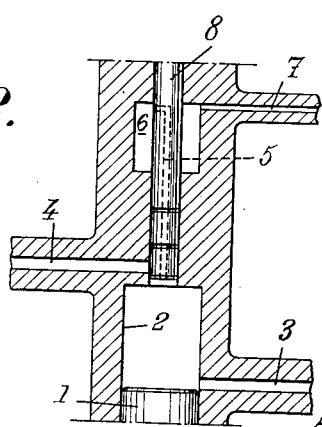

The embodiment illustrated by Fig. 2 differentiates from that shown in Fig. 1 essentially by the fact that the delivery conduit 4, instead of opening directly into cylinder 2, opens, above the top wall of said cylinder, into the housing provided in the pump body for rod 8. Consequently, in this case rod 8 further serves to replace the usual check valve provided in such injection devices. The delivery of fuel from cylinder 2 into conduit 4 can take place only after rod 8 has been moved upwardly a distance sufficient to close the leak passage 5. Therefore, not only do I dispense with the usual check valve but also I may use a spring 9 stronger than in the case of Fig. 1 since the pressure of the fuel can act upon the injector only after rod 8 has been moved sufficiently to close the leak passage.

Figure 3:
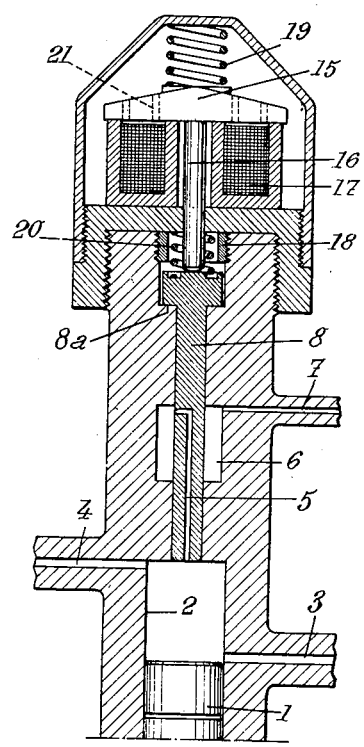

In the embodiment shown by Fig. 3, the adjustable spring 9 is replaced by a "magnetic locking device" constituted by an electro-magnet.

In this construction, rod 8 is held in its lower position by an armature 15 rigid with a rod 16 in line with rod 8 and applied against the enlarged upper end of said rod 8. This armature 15 is subjected to the action of an electro-magnet 17 mounted at the upper end of the pump body. As long as the force of attraction of this electro-magnet is greater than the force exerted by the pressure inside cylinder 2 on the lower end of rod 8, said rod remains in its lower position, for which leak passage 5 is open. As soon as the pressure directed upon the lower end of rod 8 exceeds the force of attraction of the electro-magnet, armature 15 moves upwardly and rod 8 is immediately displaced in the upward direction, thus causing this passage 5 to be closed. This upward displacement of rod 8 may be limited by an annular abutment 18 fixed in the pump body and cooperating with the top face of the enlarged end of rod 8. The force of electro-magnet 17 is for instance determined in such manner that armature 15 is released, and rod 8 is allowed to move upwardly, for a pressure equal to 50 atmospheres. Springs 19 and 20 serve to return armature 15 and rod 18 into their initial position as soon as the pressure in cylinder 2 drops down, due to the return of piston 1. Passages 21 provided in armature 15 prevent the air located under the armature from exerting a dash-pot effect opposing the return movement thereof.

Figure 4:
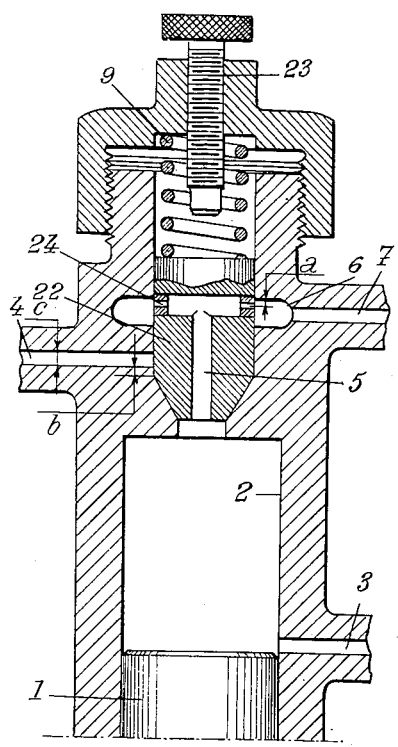

The embodiment illustrated by Fig. 4 corresponds to that of Fig. 2 with the difference that rod 8 is replaced by a valve 22 the lower end of which is of conical shape and cooperates with a conical seat provided in the pump body above cylinder 2. This valve 22 controls the communication between cylinder 2 and delivery conduit 4. Furthermore, due to its conical shape, the opening of this valve causes an increase of the area afforded to the fuel compressed in cylinder 2, whereby once the opening of valve 22 has been started, for instance by a pressure of 50 atmospheres, this valve is immediately fully opened by a quick upward displacement, this displacement being limited by an adjustable abutment 23. The leak passage 5 provided in valve 22 opens through one or several passages such as 24 into the discharge chamber 6. The axes of these passages are located at a distance $a$ equal to some tenths of a millimeter below the top wall of chamber 6. The distance $b$ which corresponds to the length of displacement of valve 22 necessary to start the opening of the delivery conduit 4 is also very small but greater by some tenths of a millimeter than distance $a$.

The minimum distance which must exist between the lower end of abutment 23 and the top face of valve 22 must be at least equal to the sum $b+c$, $c$ being the diameter of the delivery conduit 4.

From what precedes it results that the modifications brought to the injection advance by the means above described act only upon the beginning of injection but not on the end thereof, whereby variations of the advance, if only such means are provided, also produce modifications of the amount of fuel that is injected, these modifications being such that the amount that is injected increases with the injection advance and consequently with the speed of the engine.

In some cases, it is useful to make the means that serve to adjust the advance such that they act at the same time to perform an auto-regulation, as a function of the speed, of the amount of fuel injected on every pump stroke, without interfering with the automatic adjustment of the advance. For this purpose, I may make use of the space that rod 8 (Figs. 1 to 3) or valve 22 (Fig. 4) clears when moving under the effect of the pressure existing inside cylinder 2. In order to give a sufficient value to this space and also to permit of obtaining the desired variation of said space, I dispense with abutment 12 (Fig. 1) or 23 (Fig. 4) or I retract it sufficiently to enable rod 8 or valve 22 acting as a piston to have a variable displacement of a given length after it has closed the leak passage 5. Furthermore, the means for driving piston 1, which consist for instance of a cam, are arranged in such manner that the speed of this piston keeps increasing after the opening of the injector. Consequently, the pressure in cylinder 2 increases also after the opening of the injector, the increase of this pressure being always quicker than the increase of the speed of the engine. Furthermore, return spring 9 is given a force sufficient to enable rod 8 or valve 22 to lift during the whole period of injection so as more and more to compress the spring and to retract from the injection circuit a volume of fuel proportional to the displacement of this rod or valve.

Consequently, at the end of injection, spring 9 expands and the whole of the volume of fuel retracted from the circuit by the displacement of rod 8 (Fig. 1) or valve 22 (Fig. 4) flows out to the reservoir.

It follows that, by removing or more or less unscrewing abutment 13 (or 23), I reduce the volume of fuel injected on every pump stroke in a proportion variable with the speed of the engine and which increases therewith.

It is clear that by combining the parameters of the sytem (spring, diameters, bores, passages), it is possible to obtain either a mere compensation of the excess of volume produced by the advance of injection, or an overcompensation which permits of dispensing, in some cases, with any other system for adjusting the volume injected as a function of the speed. This adjustment may also be varied manually by modifying the force of spring 9 by means of nut 11.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination with a fuel injector adapted to open under the action of the pressure of fuel fed thereto when said pressure reaches a first predetermined value, a fuel feed pump which comprises, in combination, a pump body forming a cylinder, a piston reciprocable in said cylinder, a delivery conduit in communication with the inside of said cylinder and leading toward said injector, driving means for reciprocating said piston in said cylinder, said driving means being arranged to give an increasing speed to said piston during the inward stroke thereof, means in said pump body forming a leak passage for fuel from said cylinder to the outside thereof, a slide valve distinct from said piston and movable in a path with respect to said pump body between opening and closing positions at opposite ends of said path to control said leak passage, said slide valve being mounted to be hydraulically urged by the fuel pressure in the cylinder toward its leak passage closing position, and biasing means interposed between said pump body and said slide valve for opposing the hydraulic thrust of said fuel pressure on said slide valve to maintain said slide valve in leak passage opening position at all times when said fuel pressure is below a second predetermined value which is lower than said first predetermined value and to let said slide valve close said leak passage as soon as said fuel pressure in the pump cylinder has reached said second predetermined value.

2. A fuel feed pump according to claim 1 in which said leak passage extends through said slide valve.

3. A fuel feed pump according to claim 1 further including means for adjusting the strength of said biasing means.

4. A fuel feed pump according to claim 1 in which said pump body is provided with a cylindrical bore opening into said cylinder, said slide value being slidable in said bore, said delivery conduit opening into the cylindrical wall of said bore.

5. A fuel feed pump according to claim 1 in which said pump body is provided with a recess opening into said cylinder, the portion of said recess adjoining said cylinder being of frusto-conical shape and in line with said cylinder and the next portion of said recess being of cylindrical shape and in line with said frusto-conical portion, said slide value being of a shape corresponding to that of said recess, said delivery conduit opening into the cylindrical wall of said recess.

6. A fuel feed pump according to claim 1 in which said slide value is mounted to be able to move beyond the position thereof for which said leak passage is closed, said piston being driven in such manner that its speed keeps increasing after said leak passage is closed.

References Cited in the file of this patent

UNITED STATES PATENTS

| | | |
|---|---|---|
| 2,173,813 | Bischof | Sept. 19, 1939 |
| 2,174,526 | Parker | Oct. 3, 1939 |
| 2,225,019 | Retel | Dec. 17, 1940 |
| 2,410,517 | Muller et al. | Nov. 5, 1946 |
| 2,410,947 | Johnson | Nov. 12, 1946 |
| 2,537,087 | Pyk et al. | Jan. 9, 1951 |
| 2,582,535 | Drouot | Jan. 15, 1952 |
| 2,696,786 | Fleck et al. | Dec. 14, 1954 |